United States Patent
Lin et al.

(10) Patent No.: US 8,373,972 B2
(45) Date of Patent: Feb. 12, 2013

(54) SOLID ELECTROLYTIC CAPACITOR HAVING A PROTECTIVE STRUCTURE AND METHOD FOR MANUFACTURING THE SAME

(75) Inventors: Ching-Feng Lin, Hsinchu County (TW); Chi-Hao Chiu, Hsinchu (TW); Wen-Yen Huang, Taoyuan County (TW); Chun-Chia Huang, Tainan County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 255 days.

(21) Appl. No.: 12/908,129

(22) Filed: Oct. 20, 2010

(65) Prior Publication Data
US 2012/0099247 A1 Apr. 26, 2012

(51) Int. Cl.
*H01G 9/00* (2006.01)
(52) U.S. Cl. ........ 361/523; 361/525; 361/528; 361/529; 361/517; 361/519
(58) Field of Classification Search .................. 361/523, 361/516–519, 525, 528–529, 535–541; 29/25.01, 29/25.03
See application file for complete search history.

(56) References Cited

U.S. PATENT DOCUMENTS

| | | | |
|---|---|---|---|
| 6,249,424 B1 * | 6/2001 | Nitoh et al. | 361/523 |
| 6,661,645 B1 * | 12/2003 | Sakai et al. | 361/523 |
| 6,970,344 B2 * | 11/2005 | Arai et al. | 361/528 |
| 7,400,492 B2 * | 7/2008 | Baba et al. | 361/528 |
| 7,961,454 B2 * | 6/2011 | Matumoto et al. | 361/528 |

* cited by examiner

Primary Examiner — Nguyen T Ha
(74) Attorney, Agent, or Firm — Rosenberg, Klein & Lee

(57) ABSTRACT

A solid electrolytic capacitor with a protective structure, which includes stacked capacitor elements electrically connected to the positive and negative terminal. A packaging material such as synthetic resin is used to encapsulate the capacitor elements, the positive terminal, and the negative terminal. Before packaging, a protective layer is formed by a colloid material, which covers the main body of the capacitor that includes the capacitor elements, the positive terminal, and the negative terminal. The protective layer provides a better seal and relieves the external pressure exerting on the capacitor during the packaging process. The protection prevents structural damage to the capacitor's main body while reducing the risk of short-circuits and excessive current leakage.

9 Claims, 7 Drawing Sheets

SOLID ELECTROLYTIC CAPACITOR HAVING A PROTECTIVE STRUCTURE AND METHOD FOR MANUFACTURING THE SAME

BACKGROUND OF THE INVENTION

1. Field of the Invention

The instant disclosure relates to a solid electrolytic capacitor; in particular, a solid electrolytic capacitor with a protective structure and a method for manufacturing thereof.

2. Description of the Related Art

Referring to FIG. 1, which shows a conventional solid electrolytic capacitor 10 consists of stacked capacitor elements 6. FIG. 2 shows a separate capacitor element 6 of the conventional solid electrolytic capacitor of FIG. 1. Particularly, each capacitor element 6 has an anode portion 7 and a cathode portion 8. The bodies of the capacitors are placed on top of one another in a stack-configuration while the anodes connected to a positive terminal 12 and the cathodes connected to a negative terminal 13. Conventionally, the portions of the capacitor elements 6 are joined by conductive adhesives (shown as layer 18 in FIG. 1), and a synthetic resin material 14 is applied directly to cover the capacitor elements 6. Thus, the anode, the cathode, and the stacked capacitor elements form the main body of the capacitor unit. Furthermore, with the exception of the bottom surface of the positive and negative terminals 12 and 13, the synthetic resin material 14 substantially covers the upper surface of the capacitor structure to form the capacitor package.

Each capacitor element 6 is made of a dielectric oxide film 2 and a cathode layer 3 forming over an aluminum foil 1. Specifically, the cathode layer 3 comprises solid electrolytic layer 3$a$, which is created from a conductive polymer known as polythiophene; a carbon layer 3$b$, and a silver coating 3$c$. The section where the cathode layer 3 forms over the dielectric oxide film 2 defines a cathode region 8. On the other hand, the section without the cathode layer 3 defines an anode region 7. When stacking the capacitor element 6, soldering (anode welding) is performed between the neighboring anode regions 7. In addition, a conductive adhesive 18 is used between the neighboring cathode regions 8 of the capacitor element 6. Thus, the stacked solid electrolytic capacitor 10 is formed.

A first and a second groove 16 and 17 are disposed near the border region 15 between the cathode region 8 and the anode region. The anode region 7 may be easier bent at the first groove 16 and the second groove 17. The first groove 16 and the second groove 17 act to reduce the bending stress around the border 15 between the anode region 7 and the cathode region 8. However, during the manufacturing process of the capacitor, especially during the application of the synthetic resin 14, a large force is usually applied for molding and shaping of the resin structure. Thus, the large force applied during the manufacturing process may damage the capacitor element 6 easily. Moreover, the structural damage may cause short-circuit and excessive current leakage of the capacitor unit. Therefore, heavy emphasis has been placed on protecting the capacitors during the manufacturing process.

SUMMARY OF THE INVENTION

One particular aspect of the instant disclosure is to provide a solid electrolytic capacitor having a protective structure and a manufacturing method thereof. Particularly, the instant disclosure utilizes an additional insulation layer to cover the main body of the capacitor unit to relieve the mechanical stress suffered thereon during the manufacturing process. Moreover, the insulation layer also provides an air-tight structure in the main body of the instant capacitor unit.

The solid electrolytic capacitor of the instant disclosure comprises a positive terminal, a negative terminal, and at least one capacitor element forming a main capacitor body; an insulating element providing a substantially air-tight buffering structure over the main body; and a packaging material disposed over and substantially covers the insulation element. The capacitor elements may be stacked on the upper and/or bottom surface(s) of the positive and negative terminals in forming the main body. The anode and cathode region of each capacitor element are electrically connected to the positive and negative terminal respectively. The insulating element is formed by at least one colloid material and covers the main body of the capacitor. The insulation element forms a buffering structure that offers air-tight protection. The positive and negative terminals are partially exposed outside of the insulating element, and the packaging material is disposed to enclose the insulating element.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
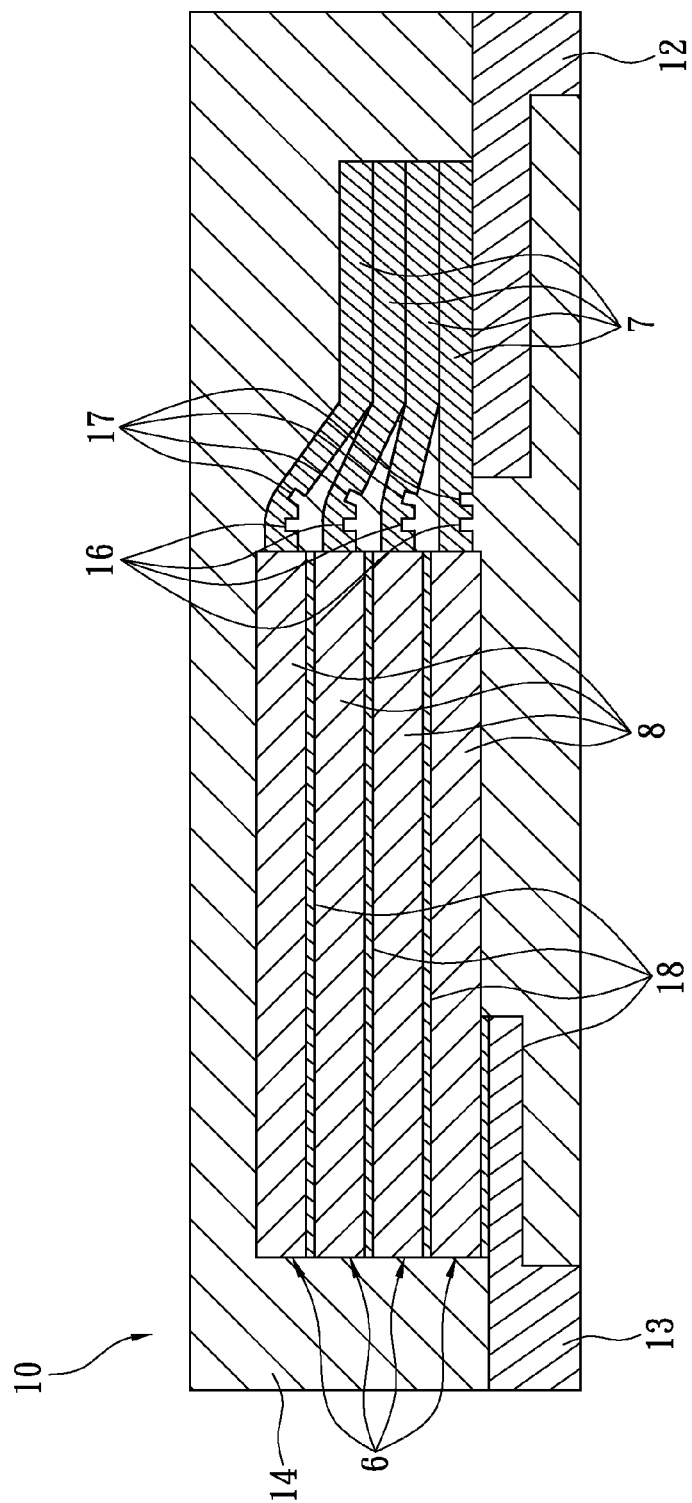
FIG. 1 shows a cross-sectional view of a conventional solid electrolytic capacitor.
Figure 2:
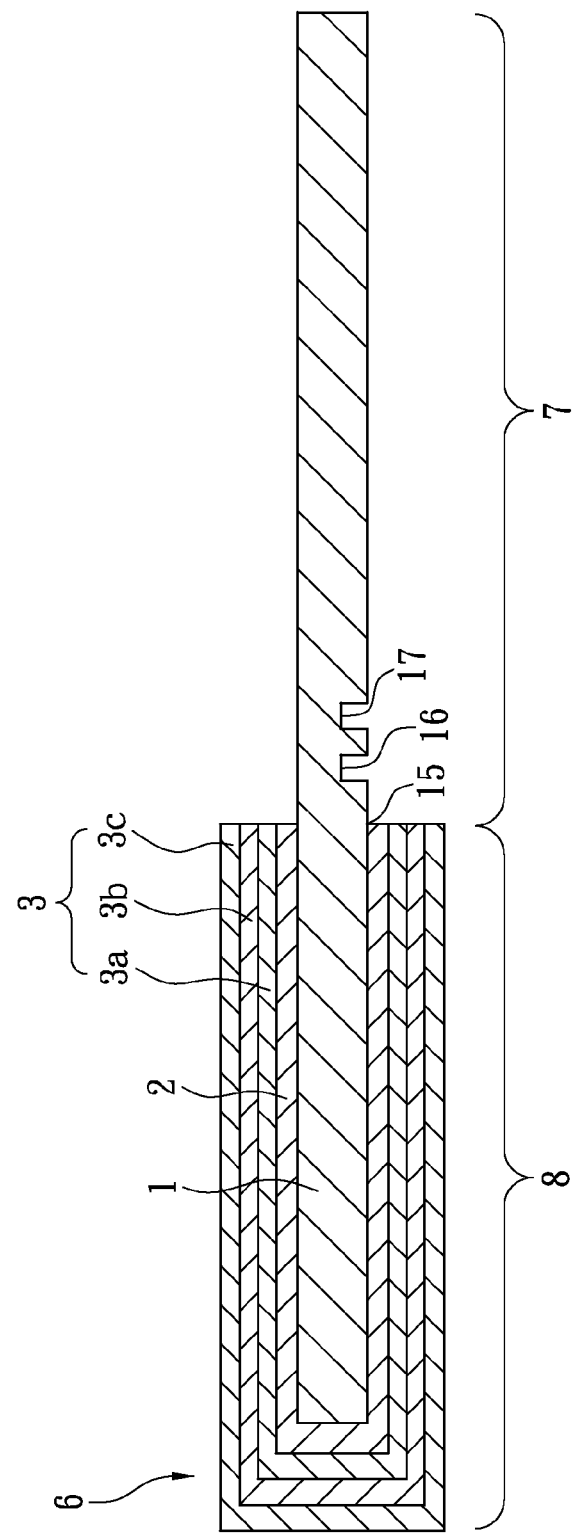
FIG. 2 shows a cross-sectional view of a conventional capacitor element of a solid electrolytic capacitor.
Figure 3:
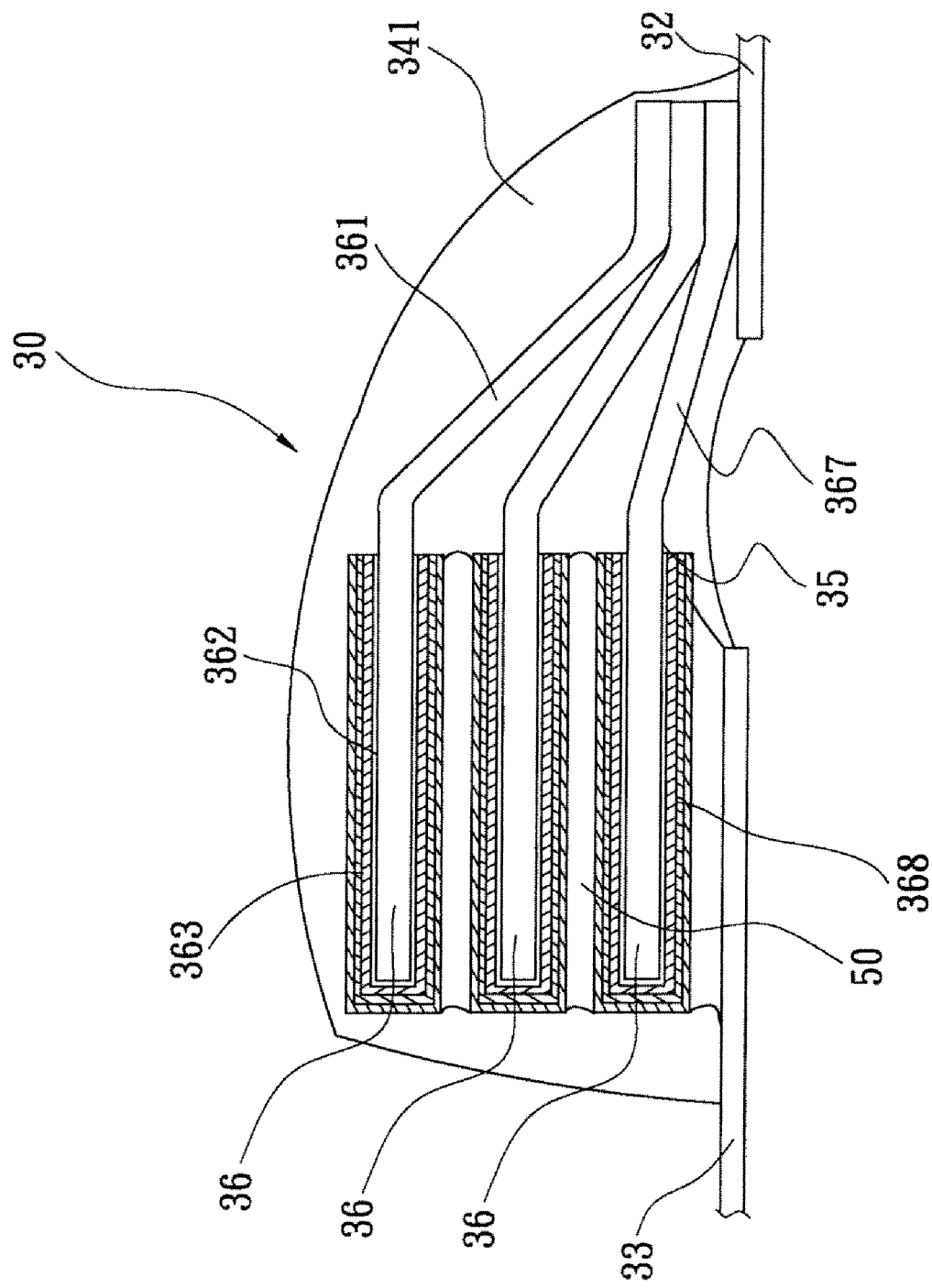
FIG. 3 shows a cross-sectional view of a solid electrolytic capacitor according to the first embodiment of the instant disclosure.
Figure 4:
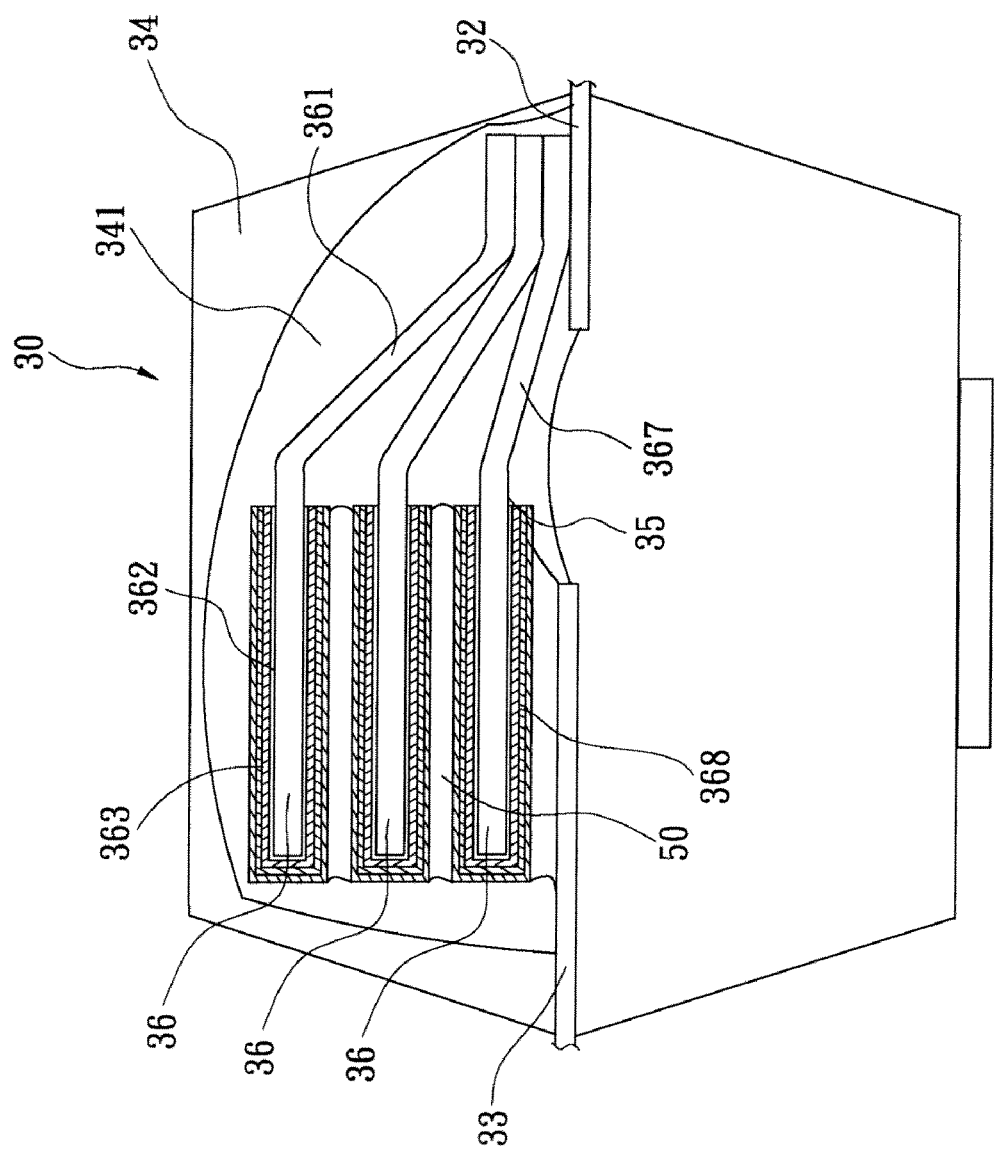
FIG. 4 shows another cross-sectional view of a solid electrolytic capacitor according to the first embodiment of the instant disclosure.

Please refer to FIGS. 3 and 4. The instant disclosure of a solid electrolytic capacitor 30 includes a main capacitor body comprising a positive terminal 32, a negative terminal 33, and at least one capacitor element 36 arranged in a stacked-configuration. In the first embodiment, as shown in FIGS. 3 and 4, the capacitor elements 36 are stacked on the upper surface of the positive and the negative terminals 32 and 33. Prior to packaging, at least one colloid layer (insulating element) is first disposed over the main body of the capacitor unit. After the colloid cures and forms an air-tight protective layer 341 over the main capacitor body (shown in FIG. 3), the packaging material (synthetic resin) 34 is disposed to encapsulate the colloid-covered main capacitor body (shown in FIG. 4). Since excessive force can cause damage to the main body of the capacitor and lead to short-circuit abnormality and increased current leakage of the capacitor unit, the protective layer 341 may help to relieve the damage caused by external force exerted on the main capacitor body during the packaging process. The protective layer 341 also improves the air-tightness of the capacitor structure.

Figure 5:
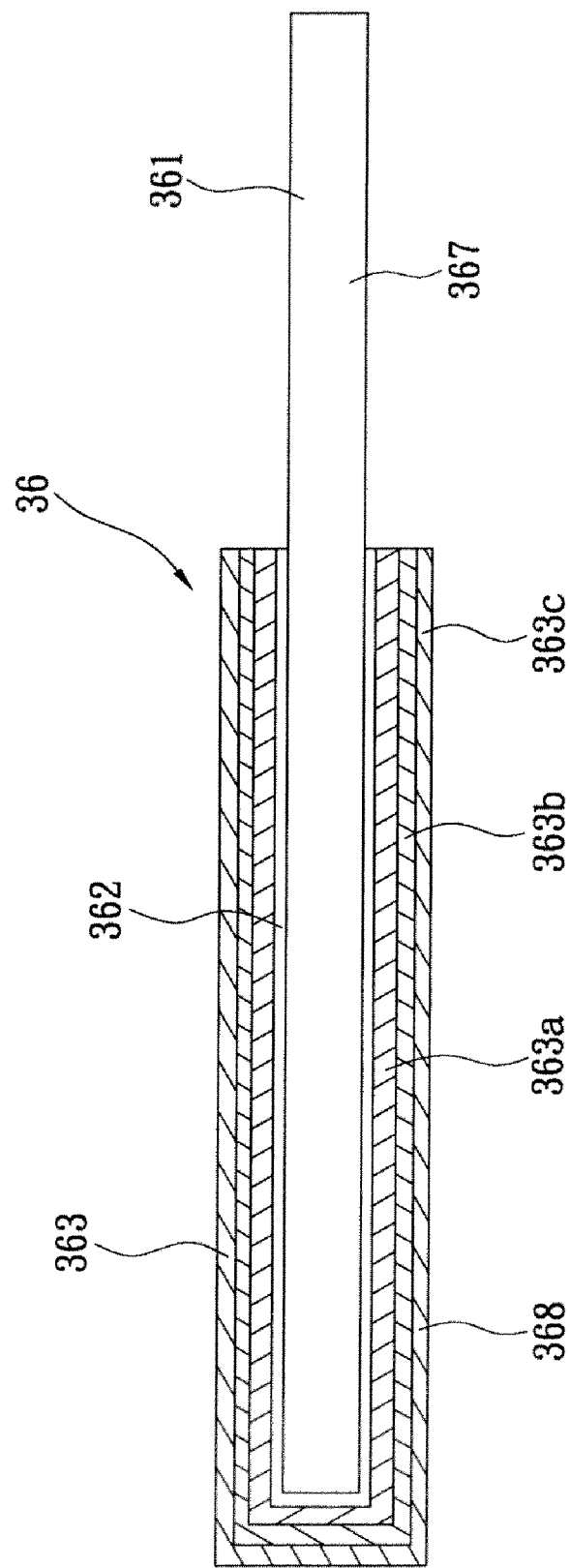
FIG. 5 shows a cross-sectional view of a capacitor element of a solid electrolytic capacitor according to the instant disclosure.

Please refer to FIG. 5. As previously discussed, the capacitor element 36 comprises a conductive body 361. One end of the conductive body 361 defines an anode portion 367, while a dielectric oxide film 362 and a cathode layer 363 is formed over the surface of the other end of the conductive body 361 to define a cathode portion 368. The cathode layer 363 includes a layer of a solid electrolytic layer 363a, which is created from a conductive polymer such as polythiophene. Other layers that make up the cathode layer 363 are a carbon layer 363b and a silver coating layer 363c. The portion where the cathode layer 363 forms above the dielectric oxide film 362 makes up the cathode region 368. The portion without the cathode layer 363 forms the anode region 367. When stacking the capacitor element 36, anode welding is performed between the neighboring anode regions 367. In addition, a conductive adhesive 50 is applied between the cathode regions 368 of the capacitor element 36. Thus, the stacked solid electrolytic capacitor 30 is formed.

The fabrication procedure for the capacitor element 36 will be discussed as follows. A conductive body, such as an aluminum foil, is submerged within the adipic acid solution. Electric voltage is applied to initiate the chemical process, which generates the dielectric oxide film 362. Next, the aforementioned conductive body is submerged in a liquid mixture of 3,4-ethylenedioxythiophene, P-toluenesulfonate, and N-butyle alcohol. The dielectric oxide film 362 reacts chemically to form a conductive macromolecular polymer known as 3,4-ethylenedioxythiophene, which makes up the solid electrolytic layer 363a. Next, a carbon layer 363b is coated over the solid electrolytic layer 363a. Lastly, a silver coating 363c is added over the carbon layer 363b.

Figure 6:
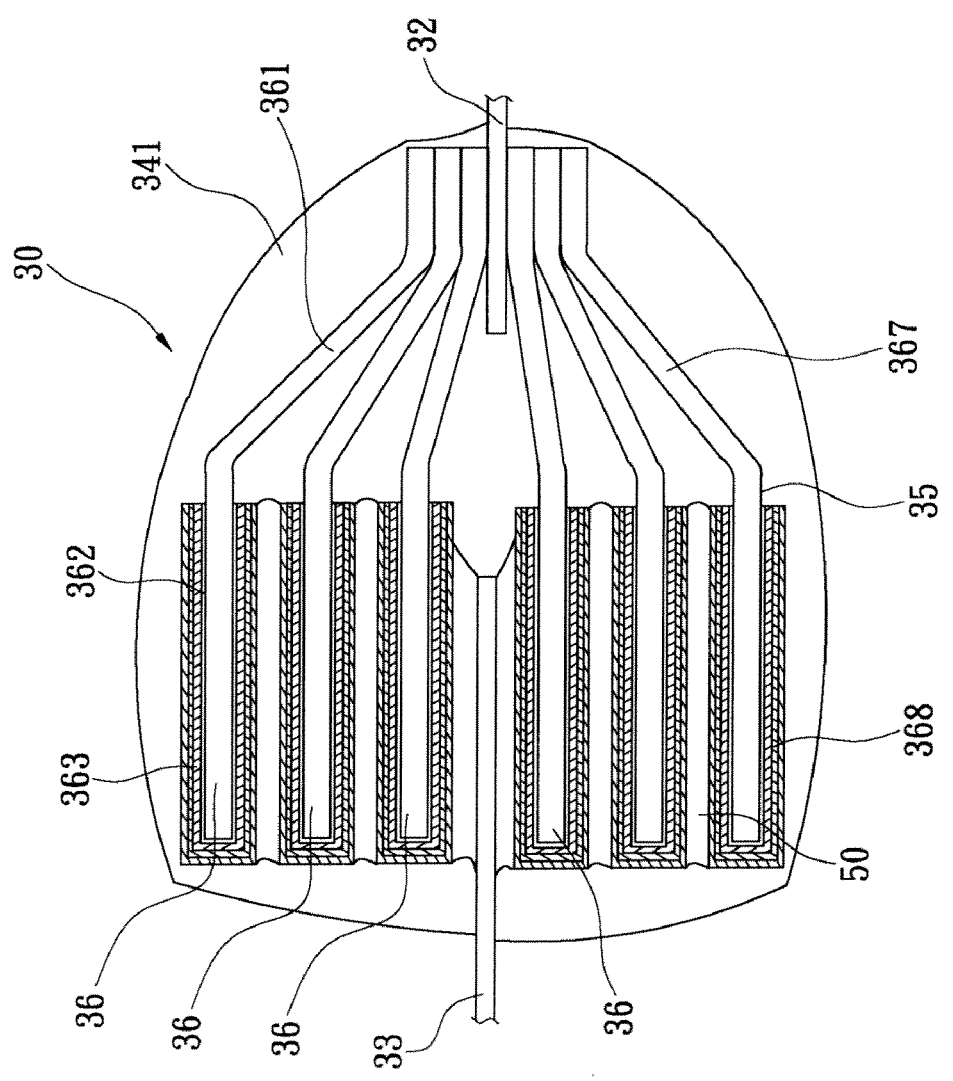
FIG. 6 shows a cross-sectional view of a solid electrolytic capacitor according to the second embodiment of the instant disclosure.
Figure 7:
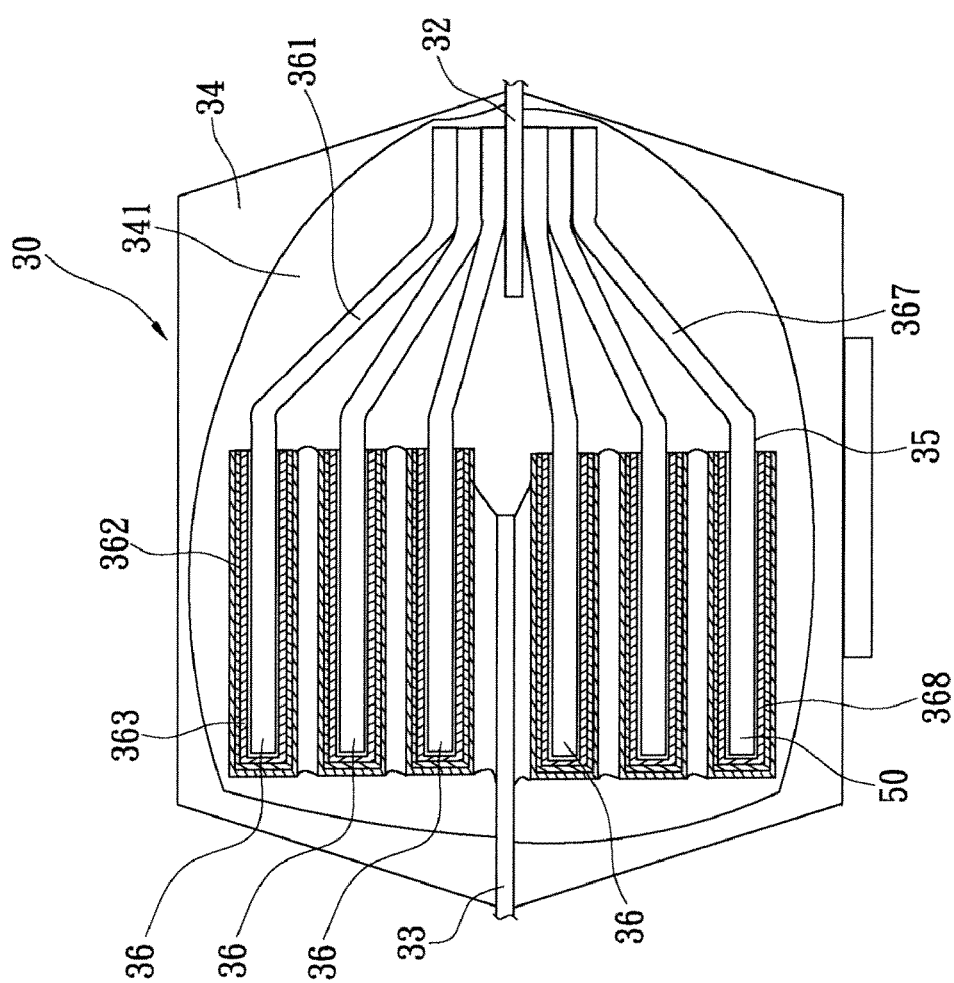
FIG. 7 shows another cross-sectional view of a solid electrolytic capacitor according to the second embodiment of the instant disclosure.

Please refer to FIGS. 6 and 7, which show the cross-sectional views of the second embodiment of the instant disclosure. The solid electrolytic capacitor 30 includes a plurality of the capacitor elements 36. The capacitor elements 36 are stacked above the positive terminal 32 and the negative terminal 33. A plurality of capacitor elements 36 are also installed on the other side of the positive terminal 32 and the negative terminal 33. The synthetic resin 34 is used to encapsulate the main body of the capacitor that includes the capacitor elements 36, the positive terminal 32, and the negative terminal 33. Prior to the packaging process, at least one colloid layer is applied to cover the main body of both capacitors, which include the capacitor elements 36, the positive terminal 32, and the negative terminal 33. After the colloid cures and forms an air-tight protective layer 341, the packaging material 34 is applied to encapsulate the capacitor elements 36, the positive terminal 32, and the negative terminal 33 (shown in FIG. 7). During the packaging process, the protective layer 341 may serve as a buffer structure for relieving the external force acting on the main body of the capacitor. By preventing structural damage to the capacitor, short-circuit abnormality and current leakage can be avoided. Moreover, for the present embodiment, the material for the protective layer is not limited to a single colloid material.

Therefore, the instant disclosure provides a method for manufacturing the solid electrolytic capacitor with the protective structure. The first step is to locate a positive and a negative terminal. Next, stack multiple capacitor elements onto the positive and negative terminal to form the main body of the capacitor. For each capacitor element, the anode and cathode region are electrically connected to the positive and negative terminal respectively. Next, use at least one colloid layer to cover the main body of the capacitor, which includes the capacitor elements, the positive terminal, and the negative terminal. The insulating structure formed by the colloid material acts as a protective layer providing an air-tight seal, leaving only part of the positive and negative terminals exposed from the protective layer. Lastly, a packaging material is used to encapsulate the colloid to complete the manufacturing process. The protective layers of the instant disclosure, particularly to the cathode portion of the capacitor element, effectively prevent possible damage from the external force during manufacturing process. The structural damage that may cause short-circuits and excessive current leakage may therefore be effectively prevented.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A solid electrolytic capacitor having a protective structure, comprising:
   a positive terminal;
   a negative terminal;
   at least one capacitor element having an anode and a cathode disposed in a stack-configuration on the upper surface of the positive and negative terminals to form a main body of the capacitor, the anode and the cathode regions of the capacitor element electrically connected to the positive and the negative terminals respectively;
   an insulating element having at least one layer of colloid disposed on the main body of the capacitor to form an air-tight protective layer, wherein the positive and negative terminals are partially exposed; and
   a packaging material enclosing the insulating element.

2. The solid electrolytic capacitor according to claim 1, wherein the air-tight protective layer is an insulating polymer.

3. The solid electrolytic capacitor according to claim 1, wherein the air-tight protective layer is a resin.

4. The solid electrolytic capacitor according to claim 1, wherein the packaging material is a polymer.

5. A solid electrolytic capacitor with a protective structure comprising:
   a positive terminal;
   a negative terminal;
   at least one capacitor element having an anode and a cathode disposed in a stack-configuration on the upper and lower surfaces of the positive and negative terminals to form a main body of the capacitor, the anode and the cathode regions of the capacitor element are electrically connected to the positive and negative terminals respectively;
   an insulating element having at least one layer of colloid disposed on the main body of the capacitor to form an air-tight protective layer, wherein the positive and negative terminals are partially exposed; and
   a packaging material enclosing the insulating element.

6. The solid electrolytic capacitor according to claim 5, wherein the air-tight protective layer is a polymer.

7. The solid electrolytic capacitor according to claim 5, wherein the air-tight protective layer is a resin.

8. The solid electrolytic capacitor according to claim 5, wherein the packaging material is a polymer.

9. A method of manufacturing a solid electrolytic capacitor having a protective structure, comprising the steps of:
providing a positive terminal and a negative terminal;
providing at least one capacitor element having an anode and a cathode in a stack-configuration on the positive and negative terminals to form a main body of the capacitor, the anode and the cathode regions of each capacitor electrically connected to the positive and negative terminal, respectively;
forming an air-tight protective layer by disposing at least one layer of insulating element comprising a colloid material on the main body of the capacitor, wherein the positive and the negative terminals are partially exposed; and
applying a packaging material to enclose the insulating element.

* * * * *